US009896991B2

(12) United States Patent
Smiljanovski et al.

(10) Patent No.: US 9,896,991 B2
(45) Date of Patent: *Feb. 20, 2018

(54) EXHAUST-GAS-TURBOCHARGED INTERNAL COMBUSTION ENGINE HAVING AT LEAST TWO TURBINES AND SWITCHABLE OUTLET OPENINGS, AND METHOD FOR OPERATING AN INTERNAL COMBUSTION ENGINE OF SAID TYPE

(71) Applicant: Ford Global Technologies, LLC, Dearborn, MI (US)

(72) Inventors: Vanco Smiljanovski, Bedburg (DE); Helmut Matthias Kindl, Aachen (DE); Joerg Kemmerling, Monschau (DE); Franz J. Brinkmann, Huerth-Efferen (DE); Franz Arnd Sommerhoff, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

This patent is subject to a terminal disclaimer.

(21) Appl. No.: 15/073,241

(22) Filed: Mar. 17, 2016

(65) Prior Publication Data

US 2016/0290220 A1 Oct. 6, 2016

(30) Foreign Application Priority Data

Mar. 31, 2015 (DE) .................. 10 2015 205 821

(51) Int. Cl.
*F02B 33/44* (2006.01)
*F02D 13/06* (2006.01)
(Continued)

(52) U.S. Cl.
CPC .......... *F02B 37/001* (2013.01); *F02B 37/007* (2013.01); *F02B 37/013* (2013.01);
(Continued)

(58) Field of Classification Search
CPC ...... F02B 37/001; F02B 37/007; F02B 37/16; F02B 37/18; F02B 37/013; F02B 37/025;
(Continued)

(56) References Cited

U.S. PATENT DOCUMENTS 5,857,336 A * 1/1999 Paul .................. F02B 37/00
60/597
6,415,606 B1 * 7/2002 Bowman ............ F02B 39/10
60/608
(Continued)

FOREIGN PATENT DOCUMENTS

DE 3439999 C1 * 5/1986 ............ F02B 37/013
DE 102005055996 A1 5/2007
(Continued)

*Primary Examiner* — Thai Ba Trieu
(74) *Attorney, Agent, or Firm* — Julia Voutyras; McCoy Russell LLP

(57) ABSTRACT

Systems and methods are provided for controlling boost pressure in an engine system with a parallel turbocharger. One example method includes, responsive to a first condition, deactivating a first compressor of a first turbocharger, activating each first exhaust valve of each cylinder of an engine, and deactivating each second exhaust valve of each cylinder of the engine to flow exhaust gas from the engine to a second turbocharger. The method further includes, responsive to boost pressure exceeding a threshold, maintaining deactivation of the first compressor, reactivating each second exhaust valve to flow exhaust gas from the engine to both the first turbocharger and second turbocharger, and driving an electric assist device via a first turbine of the first turbocharger.

17 Claims, 3 Drawing Sheets

(51) Int. Cl.
  *F02D 17/02* (2006.01)
  *F02B 33/00* (2006.01)
  *F02B 37/00* (2006.01)
  *F02B 37/013* (2006.01)
  *F02B 37/02* (2006.01)
  *F02B 37/18* (2006.01)
  *F02B 37/007* (2006.01)
  *F02B 37/16* (2006.01)
  *F01L 1/34* (2006.01)
  *F01L 13/00* (2006.01)
  *F01N 5/04* (2006.01)

(52) U.S. Cl.
  CPC ............ *F02B 37/025* (2013.01); *F02B 37/16* (2013.01); *F02B 37/18* (2013.01); *F01L 1/34* (2013.01); *F01L 13/0005* (2013.01); *F01L 13/0015* (2013.01); *F01L 2800/00* (2013.01); *F01L 2800/08* (2013.01); *F01N 5/04* (2013.01); *Y02T 10/144* (2013.01)

(58) Field of Classification Search
  CPC ..... F01L 1/34; F01L 13/0005; F01L 13/0015; F01L 2800/00; F01L 2800/08; F01N 5/04; Y02T 10/144
  USPC ................................. 60/612; 123/562, 198 F
  See application file for complete search history.

(56) References Cited

U.S. PATENT DOCUMENTS

| | | | |
|---|---|---|---|
| 7,540,151 B2 * | 6/2009 | Boehm | F02B 37/025 60/612 |
| 8,065,878 B2 * | 11/2011 | Vuk | F02B 41/10 60/612 |
| 8,091,357 B2 * | 1/2012 | Robel | F02B 37/013 60/612 |
| 2003/0000211 A1 * | 1/2003 | Drangel | F02B 37/025 60/602 |
| 2006/0070382 A1 * | 4/2006 | Karlsson | F02B 37/18 60/612 |
| 2010/0077747 A1 | 4/2010 | Pierpont et al. | |
| 2010/0212315 A1 * | 8/2010 | Irisawa | F02D 41/0007 60/602 |
| 2012/0240572 A1 * | 9/2012 | Schorn | F02B 37/007 60/612 |
| 2012/0240573 A1 * | 9/2012 | Kuhlbach | F02B 37/025 60/602 |
| 2014/0205426 A1 | 7/2014 | Costall | |
| 2014/0366529 A1 * | 12/2014 | Komatsu | F02B 37/013 60/600 |
| 2016/0097333 A1 * | 4/2016 | Wu | F02D 41/0007 60/600 |
| 2016/0312687 A1 * | 10/2016 | Kemmerling | F02D 41/0007 |
| 2016/0369717 A1 * | 12/2016 | Brinkmann | F02D 41/0007 |

FOREIGN PATENT DOCUMENTS

| | | | | |
|---|---|---|---|---|
| DE | 102007046657 A1 * | 4/2009 | ............ | F02B 37/007 |
| DE | 102008036308 A1 * | 2/2010 | ............ | F02B 37/007 |
| DE | 112008002126 T5 | 7/2010 | | |
| DE | 102009060339 A1 * | 6/2011 | ............ | F02B 37/007 |
| DE | 202014100426 U1 * | 3/2014 | ............ | F02B 37/007 |
| DE | 202014102191 U1 | 7/2014 | | |
| DE | 202014105279 U1 | 1/2015 | | |
| JP | 05156960 A * | 6/1993 | ............ | F02B 39/10 |

* cited by examiner

EXHAUST-GAS-TURBOCHARGED INTERNAL COMBUSTION ENGINE HAVING AT LEAST TWO TURBINES AND SWITCHABLE OUTLET OPENINGS, AND METHOD FOR OPERATING AN INTERNAL COMBUSTION ENGINE OF SAID TYPE

CROSS REFERENCE TO RELATED APPLICATION

This application claims priority to German Patent Application No. 102015205821.2, filed Mar. 31, 2015, the entire contents of which are hereby incorporated by reference for all purposes.

FIELD

The disclosure relates to an internal combustion engine.

BACKGROUND/SUMMARY

Within the context of the present disclosure, the expression "internal combustion engine" encompasses Otto-cycle engines but also diesel engines and hybrid internal combustion engines, which utilize a hybrid combustion process, and also hybrid drives which comprise not only the internal combustion engine but also an electric machine which can be connected in terms of drive to the internal combustion engine and which receives power from the internal combustion engine or which, as a switchable auxiliary drive, additionally outputs power.

Internal combustion engines have a cylinder block and at least one cylinder head which are connected to one another at an assembly end side to form the cylinders. To control the charge exchange, an internal combustion engine requires control elements—generally in the form of lifting valves—and actuating devices for actuating these control elements. The valve actuating mechanism required for the movement of the valves, including the valves themselves, is referred to as the valve drive. The cylinder head often serves to accommodate the valve drive.

During the charge exchange, the combustion gases are discharged via the outlet openings of the cylinders and the charging with charge air takes place via the inlet openings. It is the object of the valve drive to open and close the inlet and outlet openings at the correct times, with a fast opening of the largest possible flow cross sections being sought in order to keep the throttling losses in the inflowing and outflowing gas flows low and in order to ensure the best possible charging and an effective, that is to say complete, discharge of the exhaust gases. According to the prior art, therefore, the cylinders are also often provided with two or more inlet and outlet openings.

According to the prior art, the exhaust lines which adjoin the outlet openings are at least partially integrated in the cylinder head. The exhaust lines of the cylinders are generally merged to form one common overall exhaust line, or else in groups to form two or more overall exhaust lines. The merging of exhaust lines to form an overall exhaust line is referred to generally, and within the context of the present disclosure, as an exhaust manifold.

Downstream of the manifolds, the exhaust gases are may be supplied, for the purpose of supercharging the internal combustion engine, to the turbines of at least two exhaust-gas turbochargers. The advantages of an exhaust-gas turbocharger for example in relation to a mechanical charger are that no mechanical connection for transmitting power exists or is required between the charger and internal combustion engine. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases. An exhaust-gas turbocharger arranged in the exhaust-gas discharge system however results in increased exhaust-gas back pressure upstream of the turbine, which can have an adverse effect on the charge exchange.

An exhaust-gas turbocharger comprises a compressor and a turbine which are arranged on the same shaft. The hot exhaust-gas flow is supplied to the turbine of the charger and expands in said turbine with a release of energy. The shaft is thus set in rotation. The energy supplied by the exhaust-gas flow to the turbine and ultimately to the shaft is used for driving the compressor which is likewise arranged on the shaft. The compressor delivers and compresses the charge air supplied to it, as a result of which supercharging of the at least two cylinders is obtained. A charge-air cooling arrangement may be provided, by means of which the compressed charge air is cooled before it enters the cylinders.

Supercharging serves primarily to increase the power of the internal combustion engine. Here, the air required for the combustion process is compressed, as a result of which a greater air mass can be supplied to each cylinder per working cycle. In this way, the fuel mass and therefore the mean pressure can be increased. Supercharging is a suitable means for increasing the power of an internal combustion engine while maintaining an unchanged swept volume, or for reducing the swept volume while maintaining the same power. In any case, supercharging leads to an increase in volumetric power output and an improved power-to-weight ratio. For the same vehicle boundary conditions, it is thus possible to shift the load collective toward higher loads, at which the specific fuel consumption is lower.

The configuration of the exhaust-gas turbocharging often poses difficulties, wherein it is basically sought to obtain a noticeable performance increase in all rotational speed ranges. According to the prior art, a severe torque drop is however observed in the event of a certain engine speed being undershot. Said torque drop is understandable if one takes into consideration that the charge pressure ratio is dependent on the turbine pressure ratio. For example, if the engine speed is reduced, this leads to a smaller exhaust-gas mass flow and therefore to a lower turbine pressure ratio. This has the result that, toward lower engine speeds, the charge pressure ratio likewise decreases, which equates to a torque drop.

Here, it would fundamentally be possible for the drop in charge pressure to be counteracted by means of a reduction in the size of the turbine cross section, and the associated increase in the turbine pressure ratio. This however merely shifts the torque drop further in the direction of lower engine speeds. Furthermore, said approach, that is to say the reduction in size of the turbine cross section, is subject to limits because the desired supercharging and performance increase should be possible even at high engine speeds or in the case of large exhaust-gas flow rates.

In the prior art, it is sought, using a variety of measures, to improve the torque characteristic of a supercharged internal combustion engine.

This is achieved for example by means of a small design of the turbine cross section and simultaneous provision of an exhaust-gas blow-off facility. Such a turbine is also referred to as a wastegate turbine. If the exhaust-gas mass flow exceeds a critical value, a part of the exhaust-gas flow is, within the course of the so-called exhaust-gas blow-off, conducted via a bypass line past the turbine. Said approach has the disadvantage that the supercharging behavior is inadequate at relatively high engine speeds or in the case of relatively large exhaust-gas flow rates. Furthermore, according to the prior art, the blown-off exhaust gas is conducted past the turbine without being used further, and without the energy available in the hot exhaust gas being utilized.

The torque characteristic of a supercharged internal combustion engine may furthermore be improved by means of multiple turbochargers arranged in parallel, that is to say by means of multiple turbines of relatively small turbine cross section arranged in parallel, wherein turbines are activated successively with increasing engine speed or increasing exhaust-gas flow rate, in accordance with so-called sequential supercharging.

The inventors herein have recognized issues with the above-described engine systems. For example, internal combustion engines of said type still have potential for improvement because, according to the prior art, the second turbine of the second exhaust-gas turbocharger, said second turbine being acted on constantly with hot exhaust gas when the internal combustion engine is in operation, is equipped with a bypass line and exhaust gas is blown off in order to limit the charge pressure, adhere to the choke limit of the turbine and prevent thermal overloading of the turbine. According to the prior art, the blown-off exhaust gas is blown off without the energy available in the hot exhaust gas being utilized. If it were possible, by contrast, for the energy to be utilized, it would be possible to further increase the overall efficiency of the internal combustion engine.

If the first turbine is, according to the prior art, in the form of activatable turbine, further disadvantages arise. The rotational speed of the turbine decreases drastically when the latter is deactivated, such that, upon reactivation, the rotor of said turbine must initially be accelerated in order to be able to generate and provide the desired charge pressure at the compressor side. The response behavior is consequently impaired.

To ensure a minimum rotational speed of the activatable turbine, the activatable turbine could be supplied with a small exhaust-gas flow even when its outlet openings are deactivated. For this purpose, it would be necessary for a corresponding line to connect the second exhaust manifold to the first turbine, possibly with the use of at least one additional shut-off element, though this would disadvantageously increase the complexity and space requirement of the exhaust line system upstream of the turbines.

A further disadvantage of the use of an activatable turbine of the type described above, in which activatable outlet openings are used as switching means, consists in that, upon the activation of the outlet openings for the purposes of activating the turbine, the exhaust-gas flow conducted through the second turbine abruptly decreases, as in each cylinder there is now a further outlet opening, specifically the activated outlet opening, available for the exhaust gas during the charge exchange. Upon the activation of the first turbine, the charge pressure generated by the second compressor then abruptly decreases. The torque drop associated with the drop in charge pressure is undesirable.

Accordingly, examples are provided herein to at least partly address the above issues in order to improve the transient behavior of the exhaust-gas turbocharging arrangement. One example method includes, responsive to a first condition, deactivating a first compressor of a first turbocharger, activating each first exhaust valve of each cylinder of an engine, and deactivating each second exhaust valve of each cylinder of the engine to flow exhaust gas from the engine to a second turbocharger. The method further includes, responsive to boost pressure exceeding a threshold, maintaining deactivation of the first compressor, reactivating each second exhaust valve to flow exhaust gas from the engine to both the first turbocharger and second turbocharger, and driving an electric assist device via a first turbine of the first turbocharger.

In this way, during a first condition where boost demand may be met with a single turbocharger, the additional turbocharger may be deactivated and all exhaust from the engine may flow only to the single turbocharger, thus improving the transient response of the engine. If the boost pressure provided by the single turbocharger is greater than a boost demand, for example, or reaches high enough levels to cause turbocharger choke, excess exhaust gas may be diverted to the additional turbocharger rather than blown off via a wastegate or bypass. This excess exhaust gas may then be used to drive an electric assist device via the additional turbocharger. During other conditions (e.g., high engine speed/load conditions), both turbochargers may be active and provide boost to meet the higher torque demand.

By doing so, the presence of a wastegate or turbine bypass may be eliminated, thus lowering the cost, complexity, and packaging space of the engine, while still providing sufficient boost control. Further, by directing the excess exhaust gas to the first turbine via control of exhaust valves rather than a communication valve or other mechanism, exposure of such control mechanisms to high temperature/pressure exhaust may be avoided, prolonging the life of the system and lowering costs.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
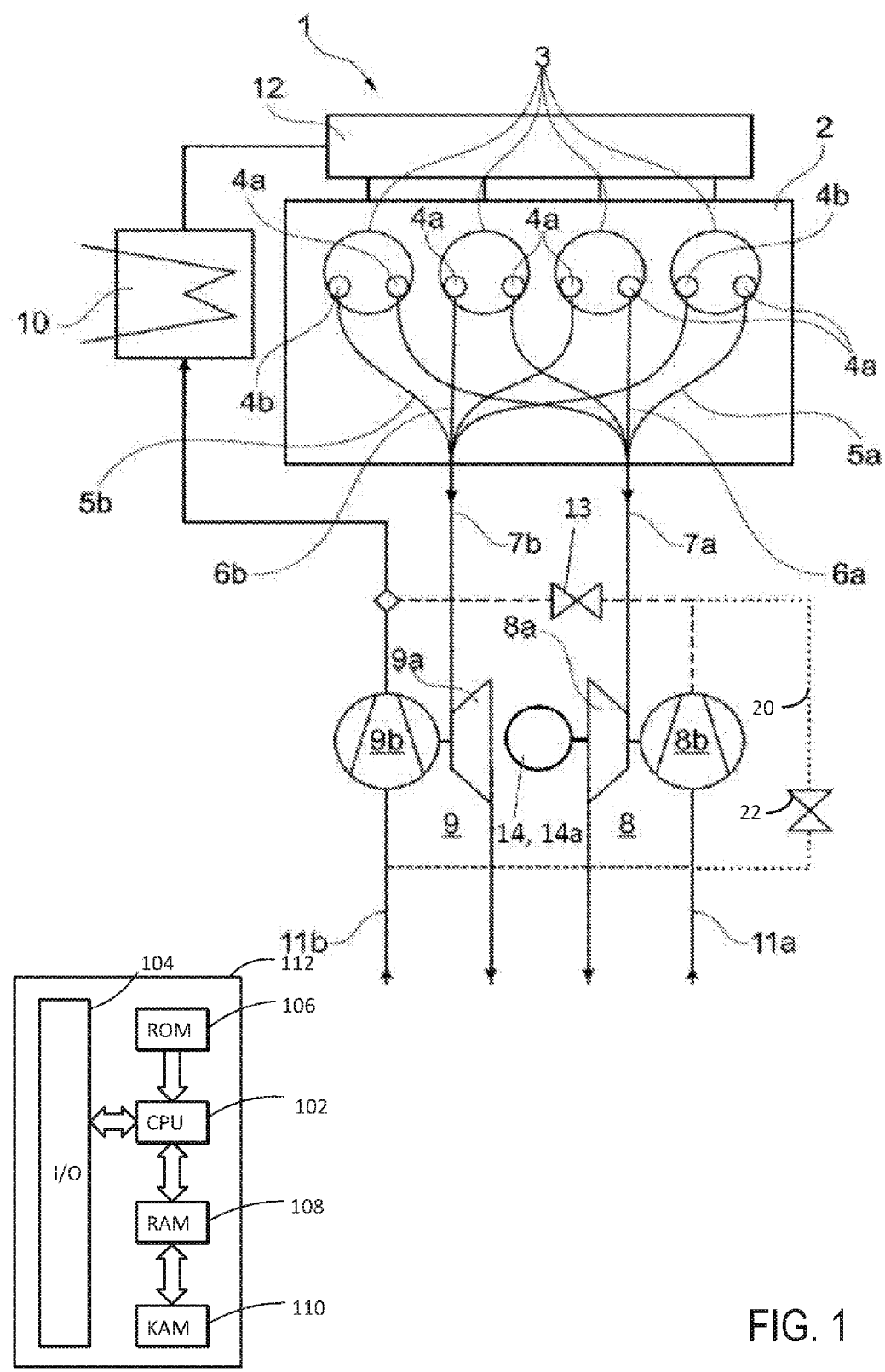
FIG. 1 schematically shows a first embodiment of the internal combustion engine.

A supercharged internal combustion engine having at least two turbines arranged in parallel is also the subject matter of the present disclosure. One turbine, specifically the turbine of a first exhaust-gas turbocharger, may in this case be in the form of an activatable turbine which is acted on with exhaust gas, that is to say activated, only in the presence of relatively high engine speeds or relatively large exhaust-gas flow rates.

To be able to deactivate or activate, that is to say switch off or switch on, said first turbine in the form of a switchable turbine, a switching device may be provided. In the present case, the valve drive performs the function of a switching device. According to the disclosure, for this purpose, each cylinder is equipped with at least two outlet openings, at least one of which is in the form of a switchable outlet opening. In this case, the exhaust lines of the at least two cylinders are configured such that the exhaust line of at least one switchable outlet opening of each cylinder issues into a first overall exhaust line, thus forming a first exhaust manifold, said first overall exhaust line being connected to the turbine of the first exhaust-gas turbocharger, and the exhaust lines of the other outlet openings of the at least two cylinders merge to form a second overall exhaust line, thus forming a second exhaust manifold, said second overall exhaust line being connected to the turbine of a second exhaust-gas turbocharger.

A deactivation of the switchable outlet openings whose exhaust lines merge to form the first overall exhaust line, thus forming the first exhaust manifold, cuts off the turbine of the first exhaust-gas turbocharger from the exhaust-gas supply, whereby said turbine is deactivated. Said switchable outlet openings can be opened during the course of the charge exchange, such that the switchable turbine is activated, that is to say acted on with exhaust gas, in the presence of relatively large exhaust-gas flow rates or relatively high engine speeds.

In this way, the torque characteristic of the internal combustion engine can be improved considerably; in particular, the torque at low engine speeds, or in the presence of low exhaust-gas flow rates, can be noticeably increased.

The fact that, according to the disclosure, the switching device is jointly formed by the valve drive and is not arranged in the exhaust-gas discharge system or in the first turbine itself has the advantage that said switching device—aside from the respective outlet valve—is not subject to high thermal loading. There is thus no risk of a malfunction or leakage of the switching device. The expected service life of the switching device is increased. Furthermore, a valve drive is provided in any case for performing the charge exchange, such that no additional switching device has to be provided. The already existing valve drive need merely be designed to be switchable or variable.

Thus, in one example the disclosure provides for a supercharged four-stroke internal combustion engine having at least one cylinder head with at least two cylinders, in which an intake system for supplying charge air to the cylinders is provided, each cylinder has at least two outlet openings for the discharge of the exhaust gases, at least one of which is in the form of a switchable outlet opening, each outlet opening being adjoined by an exhaust line for the discharge of the exhaust gases via an exhaust-gas discharge system, at least two exhaust-gas turbochargers are provided, each exhaust-gas turbocharger comprising a turbine arranged in the exhaust-gas discharge system and a compressor arranged in the intake system, the exhaust lines of the at least two cylinders are configured such that the exhaust line of at least one switchable outlet opening of each cylinder issues into a first overall exhaust line, thus forming a first exhaust manifold, said first overall exhaust line being connected to the turbine of a first exhaust-gas turbocharger, and the exhaust lines of the other outlet openings of the at least two cylinders merge to form a second overall exhaust line, thus forming a second exhaust manifold, said second overall exhaust line being connected to the turbine of a second exhaust-gas turbocharger, the compressor of the first exhaust-gas turbocharger is arranged in a first intake line of the intake system, a shut-off element being arranged in the first intake line, and at least each switchable outlet opening whose exhaust line issues into the first overall exhaust line is equipped with an at least partially variable valve drive having a switchable outlet valve which opens up the associated outlet opening between an open position and a closed position, forming a valve lift $\Delta h$, during an opening duration $\Delta t$, and wherein an electric machine is provided which is at least connectable in terms of drive to the turbine of the first exhaust-gas turbocharger and which is suitable, as a generator, for receiving power from the first turbine, and the turbine of the second exhaust-gas turbocharger does not have a bypass line.

The internal combustion engine according to the disclosure has an electric machine which is or can be connected to the turbine of the first exhaust-gas turbocharger for drive purposes. An electric machine which is connected in terms of drive to the first turbine can be operated as a generator and receive power from the turbine.

The electric machine of the internal combustion engine according to the disclosure is used and operated as a generator when necessary, that is to say at least temporarily, in order to obtain electrical energy or recover energy, that is to say in order to convert exhaust-gas energy into electrical energy.

As a consequence, the energy which is released from the exhaust-gas flow to the first turbine and ultimately to the shaft is not exclusively utilized for the drive of the compressor which is arranged on the shaft, but rather is at least partially received by the electric machine which is operated as a generator.

The need to equip the turbine of the second exhaust-gas turbocharger with a bypass line and blow off exhaust gas in order to limit or adjust the charge pressure, adhere to the choke limit of the second turbine and prevent thermal overloading of the second turbine is omitted. Rather, it is possible at the second turbine for excess exhaust gas in the first turbine to be utilized for energy recovery, instead of said exhaust gas being blown off without being utilized. This approach may also serve for lowering the exhaust-gas back pressure upstream of the second turbine if this appears necessary, for example in order to improve the charge exchange. Consequently, according to the disclosure, the turbine of the second exhaust-gas turbocharger does not have a bypass line, that is to say does not have a blow-off line.

The energy available in the hot exhaust gas is utilized, whereby the overall efficiency of the internal combustion engine is increased. With an omission of the bypass line, the exhaust-gas turbocharging arrangement is made simpler, more compact and less expensive.

The power gained through generator operation does not need to be used immediately, and may instead be stored. In this context, embodiments are provided in which the power received by the generator is stored as electrical energy in a battery.

During generator operation of the electric machine, the compressor of the first exhaust-gas turbocharger, said compressor being arranged in a first intake line of the intake system, is deactivated by virtue of a shut-off element arranged in the first intake line being closed.

In this way, when the first turbine is in a deactivated state or during generator operation, the first compressor is separated from the rest of the intake system, and it is ensured that the second compressor does not impart a delivery action into the first compressor. In order that the first compressor however does not impart a delivery action counter to the resistance of the closed shut-off element, it is advantageous for a blow-off line to be provided via which the charge air conducted through the first compressor can be delivered into a second intake line upstream of the second compressor. A further shut-off element may be arranged in said blow-off line.

According to the disclosure, the electric machine that is connectable in terms of drive to the first turbine need not a priori also be usable as an auxiliary drive, but in an embodiment is operable as an auxiliary drive and can output power to the first exhaust-gas turbocharger, that is to say to the first compressor and to the first turbine.

In the case of an electric machine which can also be used and operated as an activatable auxiliary drive, the energy gained during generator operation is then preferably utilized for the drive of the auxiliary drive, without it being necessary for energy to be provided additionally.

By means of an auxiliary drive, the response behavior and thus the operating behavior of the exhaust-gas turbocharging arrangement, and thus of the internal combustion engine, can be considerably improved.

The internal combustion engine according to the disclosure permits an operating mode in which the turbine of the second exhaust-gas turbocharger is acted on with exhaust gas from the at least two cylinders of the internal combustion engine for the purposes of building up a charge pressure, and the turbine of the first exhaust-gas turbocharger is deactivated. For this purpose, those switchable outlet openings of the cylinders whose exhaust lines issue into the first overall exhaust line are deactivated.

An operating mode in which all of the switchable outlet openings are activated and actuated, and both turbines are acted on with exhaust gas from the cylinders of the internal combustion engine for the purposes of building up a charge pressure, can likewise be realized. A partial deactivation of the cylinders constitutes a third operating mode.

A further operating mode is characterized in that the turbine of the second exhaust-gas turbocharger is acted on with exhaust gas from the at least two cylinders of the internal combustion engine for the purposes of building up a charge pressure, and the turbine of the first exhaust-gas turbocharger drives an electric machine which serves as a generator, for which purpose those switchable outlet openings of the cylinders whose exhaust lines issue into the first overall exhaust line are actuated correspondingly.

A switchable outlet opening within the meaning according to the disclosure may be an outlet opening which can be merely activated or deactivated, but may alternatively be an outlet opening whose associated outlet valve can be varied, that is to say adjusted, in stepped or continuously variable fashion with regard to valve lift $\Delta h$ and/or opening duration $\Delta t$.

There are thus situations in which a deactivated outlet valve deactivates and shuts off the associated outlet opening and also situations in which a deactivated outlet valve is operated with a reduced lift and/or a shortened opening duration.

If a deactivated outlet valve is operated with a reduced lift and/or a shortened opening duration, a minimum rotational speed of the first turbine can be ensured, because the first turbine is supplied with a small exhaust-gas flow even in the case of deactivated outlet openings. The response behavior is considerably improved. Upon the activation of the outlet openings, the exhaust-gas flow conducted through the second turbine also does not increase abruptly, such that the charge pressure generated by way of the second compressor does not abruptly drop. This improves the transient behavior of the exhaust-gas turbocharging arrangement.

The internal combustion engine according to the disclosure permits both the improvement in the torque characteristic, in particular at low engine speeds, and also higher efficiency, that is to say lower fuel consumption. The internal combustion engine according to the disclosure achieves the advantage of improved efficiency.

Embodiments of the internal combustion engine are provided in which the at least one cylinder of the first cylinder group has only one switchable outlet opening, the exhaust line of which issues into the first overall exhaust line. This embodiment satisfies the minimum requirements that may be placed on the first cylinder group and its outlet openings in order that the first turbine can for example be deactivated. Specifically, for this purpose, the cylinders of the first cylinder group may have at least one switchable outlet opening, wherein this relates, or may relate, to those outlet openings whose exhaust lines issue into the first overall exhaust line.

Embodiments of the internal combustion engine are also provided in which all of the outlet openings of the at least one cylinder of the first cylinder group are in the form of switchable outlet openings. This embodiment makes allowance for the fact that the cylinders of the first cylinder group may also be equipped exclusively with switchable outlet openings, and this in particular does not oppose the implementation of the method according to the disclosure, even though this equipment feature exceeds the minimum requirements.

Embodiments of the internal combustion engine are also provided in which at least two cylinders are configured in such a way that they form at least two cylinder groups with in each case at least one cylinder, wherein the at least one cylinder of a first cylinder group is a cylinder which is operational even in the event of a partial deactivation of the internal combustion engine, and the at least one cylinder of a second cylinder group is formed as a load-dependently switchable cylinder, and all of the outlet openings of the at least one cylinder of the second cylinder group are in the form of switchable outlet openings.

The internal combustion engine according to the above embodiment permits so-called partial deactivation. One approach for increasing efficiency, that is to say for reducing fuel consumption, is partial deactivation, that is to say the deactivation of individual cylinders in certain load ranges. The efficiency of an Otto-cycle engine can be improved, that is to say increased, in part-load operation by means of such partial deactivation because the deactivation of one cylinder of a multi-cylinder internal combustion engine increases the load on the other cylinders, which remain in operation, if the engine power remains constant, such that a throttle flap can be opened further in order to introduce a greater air mass into said cylinders, whereby dethrottling of the internal combustion engine is attained overall. During the partial deactivation, the cylinders which are permanently in operation operate in the region of higher loads, at which the specific fuel consumption is lower. The load collective is shifted toward higher loads.

The cylinders which remain in operation during the partial deactivation furthermore exhibit improved mixture formation owing to the greater air mass or mixture mass supplied. Further advantages with regard to efficiency are attained in that a deactivated cylinder, owing to the absence of combustion, does not generate any wall heat losses owing to heat transfer from the combustion gases to the combustion chamber walls.

Even though diesel engines, that is to say auto-ignition internal combustion engines, owing to the quality regulation on which they are based, exhibit greater efficiency, that is to say lower fuel consumption, than Otto-cycle engines in which the load is adjusted by means of throttling or quantity regulation with regard to the charge of the cylinders, partial deactivation represents a concept for reducing fuel consumption in the case of diesel engines too. In the case of diesel engines, the partial deactivation is also intended to prevent the fuel-air mixture from becoming too lean as part of the quality regulation in the event of decreasing load as a result of a reduction of the fuel quantity used.

To realize a partial deactivation, the at least two cylinders of the internal combustion engine according to the disclosure are configured so as to form at least two cylinder groups with in each case at least one cylinder. The at least one cylinder of a first cylinder group is a cylinder which is operational even during partial deactivation of the internal combustion engine, and the at least one cylinder of a second cylinder group is in the form of a load-dependently switchable cylinder.

Furthermore, all of the outlet openings of the at least one cylinder of the second cylinder group are in the form of switchable outlet openings, such that, during partial deactivation, the second cylinder group can be completely separated from the exhaust-gas discharge system, that is to say does not deliver exhaust gas into the exhaust-gas discharge system. The internal combustion engine according to the above embodiment thus makes it possible to realize the operating mode of partial deactivation.

Embodiments of the internal combustion engine are provided in which the exhaust lines of the at least two cylinders merge to form overall exhaust lines within the cylinder head. The integration of the exhaust manifolds into the cylinder head reduces the mass and the length of the exhaust-gas discharge systems from the outlet openings to the turbines and the exhaust-gas aftertreatment systems. In this way, the exhaust-gas enthalpy of the hot exhaust gases can be utilized optimally, and fast response behavior of the turbochargers can be ensured. Furthermore, exhaust-gas aftertreatment systems arranged downstream reach their operating temperature or light-off temperature quickly, in particular after a cold start of the internal combustion engine. Furthermore, the integration of the exhaust manifolds into the cylinder head permits the densest possible packaging of the drive unit. If appropriate, the exhaust manifolds may benefit from a liquid-type cooling arrangement provided in the cylinder head, in such a way that the manifolds do not have to be manufactured from materials that are resistant to high temperatures.

In the case of supercharged internal combustion engines having at least two cylinders in an in-line arrangement along a longitudinal axis of the cylinder head, in which the at least one cylinder head can be connected, at an assembly end side, to a cylinder block, embodiments are provided wherein one overall exhaust line is arranged on that side of another overall exhaust line which faces away from the assembly end side.

In the above embodiment, the two exhaust manifolds are situated at least partially one above the other, that is to say with a spacing to one another in the direction of a cylinder longitudinal axis, because one overall exhaust line is arranged on that side of the other overall exhaust line which faces away from the assembly end side.

If the at least two cylinders are in an in-line arrangement along a longitudinal axis of the cylinder head, embodiments of the internal combustion engine are provided in which the at least two overall exhaust lines are arranged so as to be offset, with the formation of a spacing, along the longitudinal axis of the cylinder head.

In the present case, the overall exhaust lines are arranged so as to be offset along the longitudinal axis of the cylinder head with the formation of a spacing $\Delta$. The offset permits a compact design of the cylinder head and simultaneously ensures that the overall exhaust lines have an adequately large spacing to one another. In this way, sufficient structural space remains between the overall exhaust lines despite the compact design, by contrast to embodiments in which the overall exhaust lines do not have an offset along the cylinder head longitudinal axis. This also facilitates the arrangement of coolant ducts in the cylinder head between the two overall exhaust lines if it is intended to provide a liquid-type cooling arrangement.

Embodiments of the internal combustion engine are provided in which at least each switchable outlet valve of each switchable outlet opening whose exhaust line issues into the first overall exhaust line is an outlet valve which is adjustable with regard to the valve lift $\Delta h$.

Both in the cases in which a deactivated outlet valve shuts off and blocks the associated outlet opening and in the cases in which a deactivated outlet valve is operated with a reduced lift, it may be the case, for the operation of an internal combustion engine in which the switchable outlet valve is an outlet valve which is adjustable with regard to the valve lift $\Delta h$, that embodiments are advantageous in which a deactivated outlet valve is activated by virtue of the associated valve lift being progressively increased.

If lifting valves are used which are not only switchable, that is to say can not only be activated and deactivated, but can be adjusted with regard to the valve lift $\Delta h$, the valve lift $\Delta h$ can be successively increased. In this way, the exhaust-gas flow that is discharged from a cylinder via an activated outlet opening can be increased successively, that is to say gradually, and does not need to be realized to the full extent in an abrupt manner.

In this connection, embodiments of the internal combustion engine are provided in which at least each switchable outlet valve of each switchable outlet opening whose exhaust line issues into the first overall exhaust line is an outlet valve which is adjustable in two-stage fashion with regard to the valve lift $\Delta h$. In the present case, a deactivated outlet valve is activated by virtue of the associated valve lift being increased in one step.

In this connection, embodiments of the internal combustion engine are also provided in which at least each switchable outlet valve of each switchable outlet opening whose exhaust line issues into the first overall exhaust line is an outlet valve which is adjustable in multi-stage fashion with regard to the valve lift $\Delta h$. A deactivated outlet valve is activated by virtue of the associated valve lift being increased in stepped fashion.

In this connection, embodiments of the internal combustion engine are provided in particular in which at least each switchable outlet valve of each switchable outlet opening whose exhaust line issues into the first overall exhaust line is an outlet valve which is adjustable in continuously adjustable fashion with regard to the valve lift $\Delta h$. A continuously adjustable outlet valve permits continuously variable adjustment of the exhaust-gas flow rate conducted past the second turbine.

Embodiments of the internal combustion engine are provided in which at least each switchable outlet valve of each switchable outlet opening whose exhaust line issues into the first overall exhaust line is an outlet valve which is adjustable with regard to the opening duration $\Delta t$. The statements made in conjunction with the lift apply analogously.

In the case of supercharged internal combustion engines with partial deactivation and with at least four cylinders in an in-line arrangement along a longitudinal axis of the cylinder head, embodiments are provided wherein the outer cylinders form one cylinder group and the at least two inner cylinders form another cylinder group.

Embodiments of the internal combustion engine are provided in which the overall exhaust lines merge to form a common exhaust line downstream of the turbines. It is then possible for exhaust-gas aftertreatment of all of the exhaust gas from the at least two cylinders to be performed jointly, specifically by way of an exhaust-gas aftertreatment system arranged in the common exhaust line. This may for example be a particle filter, an oxidation catalytic converter and/or an exhaust-gas aftertreatment system for the reduction of nitrogen oxides.

Alternatively or in addition, an exhaust-gas aftertreatment system, and also possibly multiple exhaust-gas aftertreatment systems, may also be provided in each overall exhaust line. This permits a more close-coupled arrangement of the exhaust-gas aftertreatment systems, that is to say close to the outlet openings of the cylinders. This embodiment also makes allowance for the fact that the turbines that are provided are operated differently. Different exhaust-gas flow rates and exhaust-gas temperatures may require or necessitate different exhaust-gas aftertreatment systems.

Embodiments of the internal combustion engine are therefore also provided in which at least one exhaust-gas aftertreatment system is arranged in each overall exhaust line, downstream of the turbine.

Embodiments of the internal combustion engine are provided in which at least one turbine has a variable turbine geometry, which permits extensive adaptation to the respective operating point by means of adjustment of the turbine geometry or of the effective turbine cross section. Here, guide blades for influencing the flow direction are arranged upstream of the impeller of the turbine. In contrast to the impeller blades of the rotating impeller, the guide blades do not rotate with the shaft of the turbine, that is to say with the impeller. The guide blades are duly arranged so as to be stationary but not so as to be completely immovable, rather so as to be rotatable about their axis such that the flow approaching the impeller blades can be influenced.

In contrast, if a turbine has a fixed, invariable geometry, the guide blades are not only stationary but rather also completely immovable, that is to say rigidly fixed.

Embodiments of the internal combustion engine are provided in which the turbine of the second exhaust-gas turbocharger is of smaller dimensions than the turbine of the first exhaust-gas turbocharger. By means of this embodiment, the characteristic map range of the internal combustion engine in which the second compressor alone generates the charge pressure is expanded toward lower engine speeds.

Because, according to the disclosure, the excess exhaust gas at the second turbine is utilized in the first turbine for energy recovery and does not need to be blown off, unutilized, via a bypass line, the second turbine can be dimensioned to be smaller, without the need to accept losses in efficiency.

Embodiments of the internal combustion engine are provided in which the electric machine, which is connectable in terms of drive to the turbine of the first exhaust-gas turbocharger, is suitable, as an auxiliary drive for assisting the first exhaust-gas turbocharger, for making additional power available for drive purposes.

The cylinder head of a supercharged internal combustion engine is basically a component that is subject to high thermal and mechanical loading. In particular, with the integration of the exhaust manifolds, the thermal loading of the internal combustion engine and of the cylinder head is increased yet further, such that increased demands are to be placed on the cooling arrangement. Embodiments of the supercharged internal combustion engine are therefore provided in which a liquid-type cooling arrangement is provided.

In an embodiment, a method includes the compressor of the first exhaust-gas turbocharger being deactivated in that the shut-off element in the first intake line is closed, and an exhaust-gas flow rate conducted through the turbine of the second exhaust-gas turbocharger is adjusted in that the switchable outlet valves of the switchable outlet openings whose exhaust lines issue into the first overall exhaust line are adjusted with regard to the valve lift $\Delta h$ and/or the opening duration $\Delta t$, the electric machine being used as a generator in order to receive power from the first turbine.

That which has been stated in connection with the internal combustion engine according to the disclosure likewise applies to the method according to the disclosure.

Embodiments of the method are provided in which the exhaust-gas flow rate conducted through the turbine of the second exhaust-gas turbocharger is limited in that the switchable outlet valves of the switchable outlet openings whose exhaust lines issue into the first overall exhaust line are actuated. In this way, operation of the second turbine beyond the choke limit is prevented.

Embodiments of the method are provided in which a charge pressure $p_{charge}$ prevailing in the intake system downstream of the compressors is jointly influenced by virtue of the exhaust-gas flow rate conducted through the turbine of the second exhaust-gas turbocharger being adjusted.

FIG. 1 schematically shows a first embodiment of the supercharged internal combustion engine 1 which is equipped with two exhaust-gas turbochargers 8, 9. Each exhaust-gas turbocharger 8, 9 comprises a turbine 8a, 9a and a compressor 8b, 9b. The hot exhaust gas expands in the turbines 8a, 9a with a release of energy. The compressors 8b, 9b compress the charge air which is supplied to the cylinders 3 via intake lines 11a, 11b, charge-air cooler 10 and plenum 12, as a result of which supercharging of the internal combustion engine 1 is realized.

Said internal combustion engine is a four-cylinder in-line engine 1 in which the four cylinders 3 are arranged along the longitudinal axis of the cylinder head 2, that is to say in a line. The four cylinders 3 are configured and form two cylinder groups with in each case two cylinders 3, wherein the two inner cylinders 3 form a second cylinder group, the cylinders 3 of which are in the form of load-dependently switchable cylinders 3 which can be deactivated during the course of a partial deactivation, and the two outer cylinders 3 form a first cylinder group, the cylinders 3 of which are in operation even during partial deactivation.

Each cylinder 3 has two outlet openings 4a, 4b which are adjoined by exhaust lines 5a, 5b for the discharge of the exhaust gases via an exhaust-gas discharge system, wherein all of the outlet openings 4a of the two inner cylinders 3, that is to say the outlet openings 4a of the second cylinder group, are in the form of switchable outlet openings 4a, and the two outer cylinders 3, that is to say the cylinders 3 of the first cylinder group, have in each case only one switchable outlet opening 4a.

The exhaust lines 5a, 5b of the four cylinders 3 are configured such that the exhaust line 5a of an activatable outlet opening 4a of each cylinder 3 issues into a first overall exhaust line 7a, thus forming a first exhaust manifold 6a, said first overall exhaust line being connected to the turbine 8a of the first exhaust-gas turbocharger 8, and the exhaust lines 5a, 5b of the other outlet openings 4a, 4b of the four cylinders 3 merge to form a second overall exhaust line 7b, thus forming a second exhaust manifold 6b, said second overall exhaust line being connected to the turbine 9a of the second exhaust-gas turbocharger 9. The exhaust lines 5a, 5b of the cylinders 3 merge to form two overall exhaust lines 7a, 7b such that two exhaust manifolds 6a, 6b which are integrated in the cylinder head 2 are formed.

A respective exhaust-gas aftertreatment system may be provided downstream of each turbine 8a, 9a. The exhaust-gas aftertreatment systems may exhibit differences in construction and thus make allowance for the fact that the turbines 8a, 9a that are provided are at least intermittently operated with different boundary conditions, and the state variables, that is to say pressure and temperature, of the exhaust-gas stream associated with the turbines may differ significantly.

In the present case, the two overall intake lines 11a, 11b merge downstream of the compressors 8b, 9b, wherein the first compressor 8b can be separated from the rest of the intake system in order that the second compressor 9b does not impart a delivery action into the first compressor 8b. For this purpose, there is arranged downstream of the first compressor 8b a shut-off element 13 which serves for the deactivation of said compressor 8b. In order that the first compressor 8b does not have to impart a delivery action counter to the resistance of the closed shut-off element 13, a bypass line is provided in which a shut-off element is likewise arranged.

The second turbine 9a does not have a bypass line. Excess exhaust gas at the second turbine 9a is utilized in the first turbine 8a for energy recovery, and is not blown off, unutilized, via a bypass line. For this purpose, an electric machine 14 which is at least connectable in terms of drive to the first turbine 8a is provided, which electric machine, as a generator 14a, is capable of receiving power from the first turbine 8a.

The energy available in the hot exhaust gas is utilized, whereby the overall efficiency of the internal combustion engine 1 is increased. With an omission of a bypass line, the exhaust-gas turbocharging arrangement is made simpler, more compact and less expensive. The power gained by means of generator operation can be stored as electrical energy in a battery (not illustrated).

In the present case, each switchable outlet valve of each switchable outlet opening 4a whose exhaust line 5a issues into the first overall exhaust line 7a is an outlet valve which is continuously adjustable with regard to the valve lift Δh and by means of which a continuous adjustment of the exhaust-gas flow rate conducted past the second turbine 9a is possible.

The internal combustion engine 1 illustrated makes it possible to implement a first operating mode which concerns the partial deactivation. During the partial deactivation, the two inner cylinders 3 of the second cylinder group are deactivated, as are the associated outlet openings 4a. Then, the two outer cylinders 3 of the first cylinder group supply exhaust gas to both turbines 8a, 9a, whereby the exhaust-gas back pressure in the exhaust-gas discharge system is lowered, and the charge exchange of the first cylinder group during partial deactivation is improved. Efficiency is increased further.

In a second operating mode, the turbine 9a of the second exhaust-gas turbocharger 9 is acted on with exhaust gas from the four cylinders 3 of the internal combustion engine 1 and the turbine 8a of the first exhaust-gas turbocharger 8 is deactivated, for which purpose those switchable outlet openings 4a of the cylinders 3 whose exhaust lines 4a issue into the first overall exhaust line 7a are deactivated and remain closed.

In a third operating mode supplementary to the second operating mode, excess exhaust gas at the second turbine 9a is conducted through the first turbine 8a and is utilized for energy recovery, wherein the exhaust-gas flow rate conducted through the first turbine 8a and thus past the second turbine 9a is adjusted by way of those switchable outlet valves of the switchable outlet openings 4a whose exhaust lines 5a issue into the first overall exhaust line 7a. For this purpose, the valve lift Δh of the corresponding outlet valves is adjusted in continuous fashion.

Then, in a fourth operating mode, both turbines 8a, 9a of the four cylinders 3 of the internal combustion engine 1 are acted on with exhaust gas. For this purpose, all of the switchable outlet openings 4a are activated and fully actuated.

Thus, an engine system as described above includes an engine having a plurality of cylinders. In one example, the engine comprises four cylinders arranged inline. However, other cylinder numbers are possible. The cylinders are arranged into two cylinder groups, a first cylinder group and a second cylinder group. The first cylinder group may include the two outer cylinders of the inline engine while the second cylinder group may include the inner cylinders that are arranged between the outer cylinders.

Each cylinder of the engine may include two exhaust ports, each exhaust port coupled to a respective exhaust runner and controlled via a respective exhaust valve. As such, each cylinder includes a first exhaust port controlled by a first exhaust valve and coupled to a first exhaust runner. Each cylinder also includes a second exhaust port controlled by a second exhaust valve and coupled to a second exhaust runner. Each respective first exhaust runner of each cylinder may merge to form a first exhaust manifold and each respective second exhaust runner of each cylinder may merge to form a second exhaust manifold. In this way, each cylinder may be fluidically coupled, at least under some conditions, to both the first exhaust manifold and the second exhaust manifold.

In some examples, one or more cylinders of the engine may be deactivatable cylinders wherein fuel injection, intake valve, and/or exhaust valve operation may be suspended. In one example, the second cylinder group may be comprised of deactivatable cylinders while the first cylinder group may not include any deactivatable cylinders. The deactivatable cylinders may be deactivated during low engine load conditions, for example.

At least some of the exhaust valves may be switchable exhaust valves, where the valve lift, duration, and/or timing is adjustable. In one example, each exhaust valve of the second cylinder group (e.g., each first exhaust valve and each second exhaust valve of the second cylinder group) is switchable, while only one exhaust valve of each cylinder of the first cylinder group is switchable (e.g., each second exhaust valve of the first cylinder group). In such an example, the exhaust port that is controlled by the switchable exhaust valve of each cylinder of the first cylinder group is coupled to the first exhaust manifold via the respective first exhaust runner. In other words, each second exhaust port of the first cylinder group is controlled by a switchable second exhaust valve and is coupled to the first exhaust manifold.

Further, the first cylinder group includes exhaust valves that are not switchable. For example, each first exhaust valve of each cylinder of the first cylinder group is configured with a switchable exhaust valve. Rather, the valve lift, duration, and/or timing of each of the first exhaust valves of the first cylinder group are fixed, such that each first exhaust valve of the first cylinder group opens and closes with a predetermined relationship relative to the rotation of the camshaft and crankshaft, for example. Each first exhaust port of each cylinder of the first cylinder group is coupled to the first exhaust manifold via a respective first exhaust runner and controlled via a respective non-switchable first exhaust valve.

The first exhaust manifold is fluidically coupled to a first turbine of a first turbocharger and the second exhaust manifold is fluidically coupled to a second turbine of a second turbocharger. In some examples, the first turbine may not include a bypass line or wastegate and the second turbine may not include a bypass line or wastegate, such that all exhaust that travels through the first exhaust manifold also travels through the first turbine and all exhaust that travels through the second exhaust manifold also travels through the second turbine.

The first turbocharger may include a first compressor coupled to the first turbine. The first compressor may be deactivatable via a shut-off element arranged in an intake line downstream of the first compressor. When the shut-off element is closed, intake air is prevented from being drawn into the first compressor. In some examples, a compressor recirculation valve 22 is provided in a bypass line 20 around the first compressor.

The first turbine may be coupled to an electric-assist device. The electric assist device may operate as a generator under certain conditions, where rotation of the first turbine drives the electric-assist device to generate electricity for storage in on-board battery, for example. The electric-assist device may also utilize electricity to power a motor to drive rotation of the turbine during certain conditions. In some examples, the electric-assist device and/or first compressor may be selectively coupled to the first turbine via a clutch.

The first and second turbochargers may be arranged in parallel such that no exhaust communication occurs between the two turbines upstream of the turbines. The intake air that flows through the first compressor may merge with intake air that flows through the second compressor at a location downstream of the first compressor and second compressor.

The engine system may further include a control system. The control system may include a controller 112. The controller 112 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 112 may receive various signals from sensors coupled to engine 1, in addition to those signals previously discussed, including measurement of inducted mass air flow (MAF) from a mass air flow sensor; engine coolant temperature (ECT) from a temperature sensor coupled to a cooling sleeve; a profile ignition pickup signal (PIP) from a Hall effect sensor (or other type) coupled to a crankshaft of the engine; throttle position (TP) from a throttle position sensor; and absolute manifold pressure signal, MAP, from a MAP sensor. Engine speed signal, RPM, may be generated by controller 112 from signal PIP.

Storage medium read-only memory 106 can be programmed with computer readable data representing instructions executable by processor 102 for performing the methods described below as well as other variants that are anticipated but not specifically listed. Example methods are described with reference to FIG. 2.

The controller 112 receives signals from the various sensors of FIG. 1 and employs the various actuators of FIG. 1 to adjust engine operation based on the received signals and instructions stored on a memory of the controller. For example, in order to adjust exhaust valve timing, duration, and/or lift, the controller may receive feedback from one or more sensors to determine engine load, engine speed, and/or boost pressure (such as feedback from MAF, MAP, and PIP sensors) and may then adjust an actuator coupled to the exhaust valves to adjust the valve timing, duration, and/or lift, such as variable camshaft timing system actuator or other suitable actuator.

The controller may be configured (e.g., include instructions executable) to adjust the timing, duration, and/or lift of the switchable exhaust valves, adjust fuel injection, adjust compressor shut-off valve position, and/or other parameters based on operating conditions. In a first mode of operation, which may be executed responsive to engine load below a threshold (e.g., low engine load, such as 25% or less of maximum rated engine load), the controller may be configured to deactivate the deactivatable cylinders (e.g., the cylinders of the second cylinder group) by stopping fuel injection to those cylinders and/or deactivating the intake and/or exhaust valves. The fuel that would have been injected to those cylinders is instead injected to the cylinders of the first cylinder group. During the first mode of operation, the controller may be configured to maintain all of the exhaust valves of the first cylinder group in an active state, such that exhaust from the first cylinder group flows to both the first exhaust manifold and second exhaust manifold, and hence to the first turbine and second turbine.

In a second mode of operation, which may be executed during mid-to-high engine load and relatively low engine speed (e.g., 2000 RPM or lower), each cylinder may be operated (e.g., no deactivated cylinders). However, owing to the relatively low engine speed, boost demand (e.g., the amount of boost pressure needed to meet requested torque) may be low enough that sufficient boost is provided by only one turbocharger. As such, one deactivatable exhaust valve from each cylinder of the engine may be deactivated. The controller may adjust the valve lift and/or duration to deactivate the exhaust valves. The exhaust valves that are deactivated may be the second exhaust valves of each cylinder, e.g., the exhaust valves that control exhaust ports fluidically coupled to the first exhaust manifold. In this way, no exhaust flows to the first exhaust manifold or the first turbine, and all the exhaust from all the cylinders only flows to the second exhaust manifold and second turbine. The first compressor may be deactivated via fully closing the compressor shut-off valve.

However, under certain conditions, the exhaust flow may drive the first turbine to generate more boost than desired. Thus, when operating during the mid-to-high load conditions with relatively low engine speed, when actual boost exceeds boost demand, the controller may execute a third mode of operation. In the third mode of operation, the exhaust valves that were deactivated in the second mode are activated, e.g., each second exhaust valve may be reactivated. To activate the exhaust valves, the controller may command the exhaust valve timing, lift, and/or duration to be adjusted such that exhaust again flows out of the second exhaust ports and to the first exhaust manifold. During the third mode of operation, the first compressor is maintained in or placed in the deactivated state and the first turbine instead drives the electric assist device in a generator mode.

In this way, over-boost conditions may be avoided without the use of a separate turbine bypass or wastegate, thus lowering the cost and complexity of the engine.

During a fourth condition, which may be executed during mid-to-high load conditions and relatively high engine speed (e.g., greater than 2000 RPM), all the cylinders are activated and all the exhaust valves are activated. Thus, exhaust gas flows though both the first and second exhaust manifolds and the first and second turbines. The first compressor is activated, and the first turbine drives the first compressor rather than (or in addition to) the electric assist device.

Figure 2:
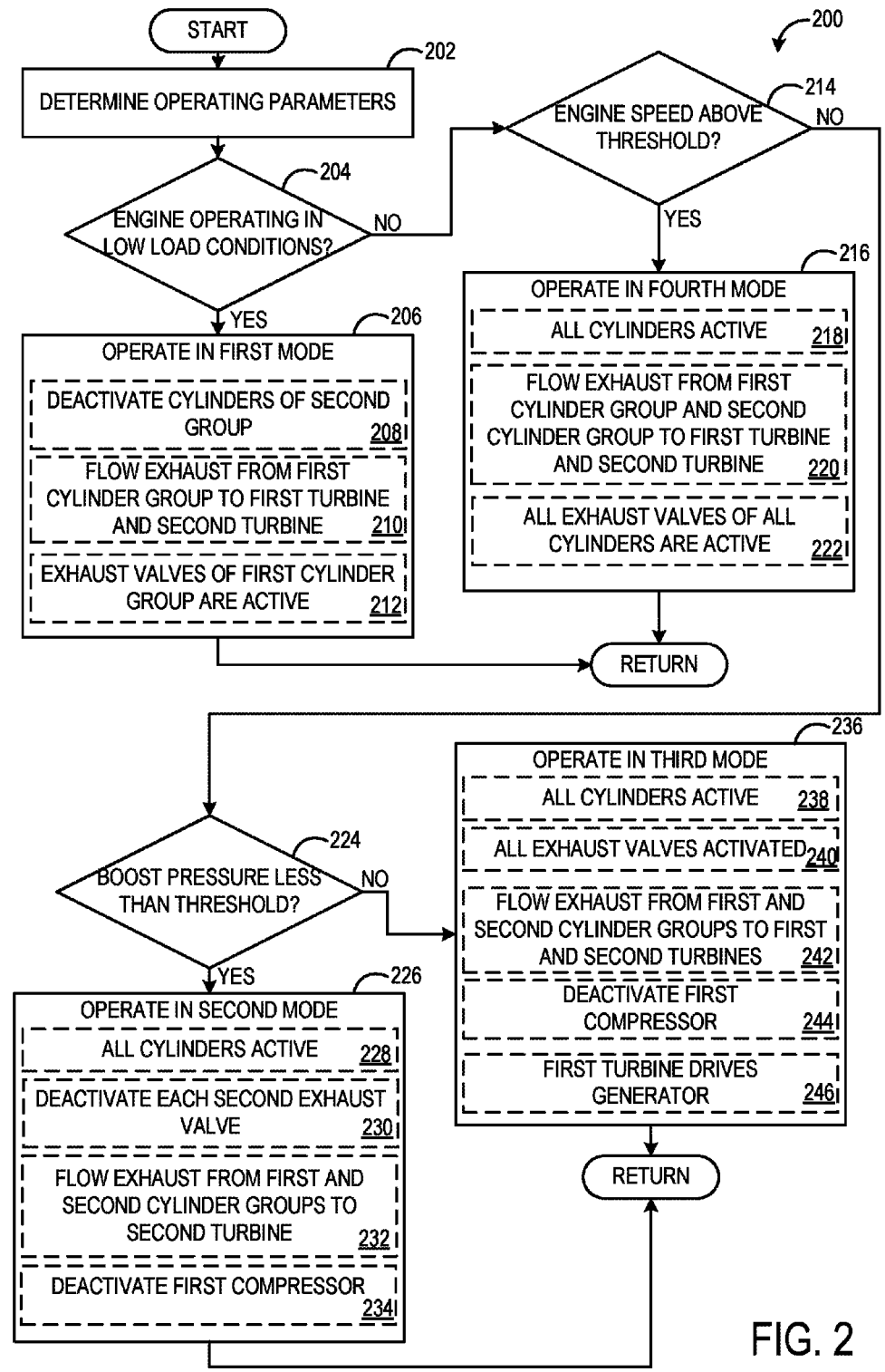
FIG. 2 is a flow chart illustrating a method for operating an engine.

Turning to FIG. 2, a method 200 for operating an engine is illustrated. Method 200 may be carried out according to non-transitory instructions stored in memory of a controller, such as controller 112 of FIG. 1, in order to adjust various operating parameters of an engine (e.g., engine 1 of FIG. 1) to operate in a given mode, depending on detected engine parameters. The engine may include a first group of cylinders (e.g., outer cylinders) and a second group of cylinders (e.g., inner cylinders), each having a first exhaust port and exhaust valve and second exhaust port and exhaust valve. As described above, each second exhaust valve may be deactivatable, and the first exhaust valves of the second group of cylinders may also be deactivatable. Further, the engine is coupled to two turbocharger arranged in parallel, with a first turbocharger coupled to an electric assist device and including a compressor that is deactivatable.

Instructions for carrying out method 200 may be executed by the controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, method 200 includes determining engine operating parameters. The determined operating parameters may include, but are not limited to, engine load, engine speed, boost pressure (which may be a measurement of intake manifold pressure relative to ambient pressure, for example), and other parameters. At 204, method 200 determines if the engine is currently operating in low engine load conditions. The low engine load conditions may include engine load below a low load threshold, such as below 30% of maximum rated load. If the engine is not operating in the low load conditions, method 200 proceeds to 214, which will be described in more detail below.

If the engine is operating in the low load conditions, method 200 proceeds to 206 to operate in a first operating mode. As explained above, the first operating mode includes deactivating one or more cylinders of the engine, and as such operation in the first mode of operation may also be dependent on other factors that affect the engine's ability to operate with less than all cylinders, such as catalyst temperature and/or regeneration status. The first mode includes deactivating one or more deactivatable cylinders, as indicated at 208. In one example, the deactivatable cylinders may include the second cylinder group (e.g., the inner cylinders of FIG. 1). To deactivate the cylinders, fuel injection and intake and/or exhaust valve actuation of the deactivatable cylinders may be suspended.

The first mode further includes flowing exhaust from the first cylinder group to the first turbine and to the second turbine, as indicated at 210. To achieve this, each exhaust valve of each cylinder of the first cylinder group is active, as indicated at 212, such that each cylinder of the first cylinder group is fluidically coupled to both the first turbine and the second turbine. Method 200 then returns.

If it is determined at 204 that the engine is not operating in low load conditions, method 200 proceeds to 214 to determine if engine speed is above a speed threshold. The speed threshold may be a suitable speed, such as 2000 RPM. In some examples, the speed threshold may vary based on engine load, e.g., the threshold may decrease as engine load increases. If the engine is not operating above the speed threshold, method 200 proceeds to 224, explained in more detail below. If the engine is operating with an engine speed above the speed threshold, method 200 proceeds to 216 to operate in a fourth mode.

The fourth mode includes operating with all cylinders activated, as the engine load demand is too high to operate with only a subset of cylinders, as indicated at 218. Further, the fourth mode includes flowing exhaust from the first cylinder group and the second cylinder group to the first turbine and the second turbine, as indicated at 220. To achieve this, all exhaust valves of all cylinders are active (e.g., actuated based on engine position), as indicated at 222. In this way, due to the high engine speed and load demand, requested torque may be met by operating all cylinders and both turbochargers. Method 200 then returns.

If engine speed is not above the speed threshold, method 200 proceeds to 224 to determine if boost pressure is less than a threshold pressure. The threshold pressure may be commanded boost pressure based on requested torque, or the threshold pressure may be a pressure above which degradation to the turbocharger(s) and/or engine may occur, such as choke limit of one or more of the turbochargers. If boost pressure is not less than the threshold, method 200 proceeds to 236, which will be explained in more detail below.

If the boost pressure is less than the threshold pressure, method 200 proceeds to 226 to operate in a second mode. Operating in the second mode includes operating with all cylinders of the engine active, as indicated at 228. Operating in the second mode further includes operating with each second exhaust valve of the cylinders deactivated, as indicated 230. As explained above, each cylinder of the engine includes two exhaust valves, at least one of which is deactivatable (e.g., each second exhaust valve). By deactivating each second exhaust valve (but keeping each first exhaust valve active), no exhaust flows through the first exhaust manifold or first turbine. As such, operating in the second mode includes flowing exhaust from the first and second cylinder groups to the second turbine, as indicated at 232. Because no exhaust flows to the first turbine, the first compressor is deactivated, as indicated at 234. The first compressor is deactivated by closing the compressor shut-off valve downstream of the first compressor, for example. Method 200 then returns.

Returning to 224, if it is determined that the boost pressure in not less than the threshold, method 200 proceeds to 236 to operate in the third mode. Operating in the third mode includes operating with all cylinders active, as indicated at 238. Further, in the third mode, all exhaust valves are active, as indicated at 240. As such, exhaust flows from the first and second cylinder groups to the first and second turbines, as indicated at 242. However, due to the lower engine speed and concomitant relatively lower boost demand, boost is still met by the second turbocharger. During the conditions where the second turbocharger may produce excess boost, rather than blow off exhaust gas via a bypass or wastegate, the exhaust gas is fed to the first turbine to drive the electric assist device in a generator mode to produce electricity which may be stored in storage device such as a battery for future use (such as for driving the electric assist device during cold engine conditions). Thus, operating in the third mode includes deactivating the first compressor at 244 and driving the electric assist as a generator with the first turbine, as indicated at 246. Method 200 then ends.

Figure 3:
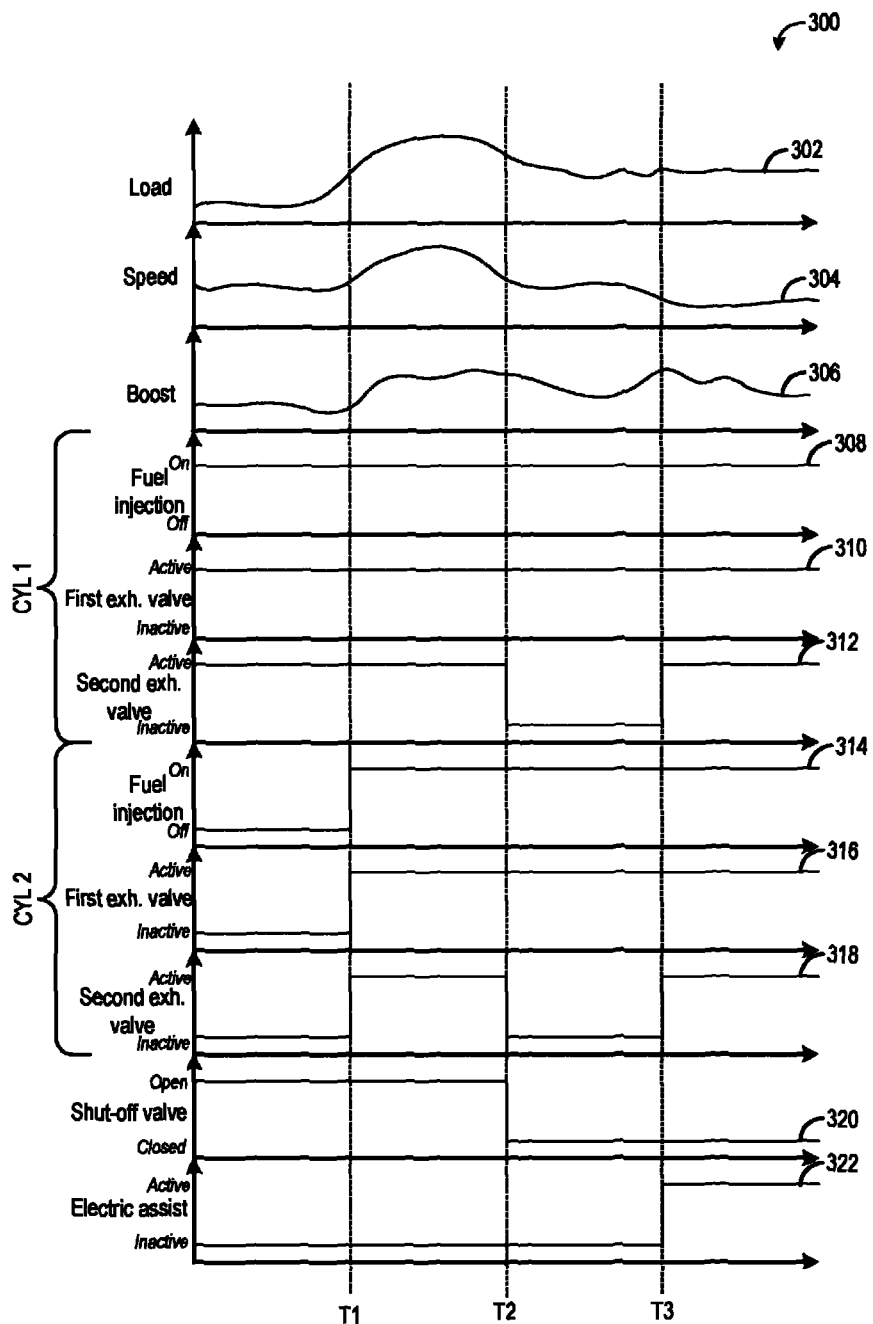
FIG. 3 is a timeline illustrating operating parameters of interest during execution of the method of FIG. 2.

FIG. 3 is a timeline 300 illustrating plots of various operating parameters that may be observed during operation of the four modes described above, such as during execution of method 200 of FIG. 2. Timeline 300 includes plots of engine load, engine speed, boost pressure, operating parameters for a first cylinder of a first cylinder group (fuel injection, first exhaust valve, and second exhaust valve status), operating parameters for a second cylinder of a second cylinder group (fuel injection, first exhaust valve, and second exhaust valve status), compressor shut-off valve status, and electric assist status. Time is depicted along the horizontal axis (x-axis) while corresponding values for the respective operating parameters are depicted along the vertical axis (y-axis).

Prior to time T1, the engine is operating in the first mode due to the relatively low engine load (as shown by curve 302). As such, the cylinders of the second cylinder group are deactivated while the cylinders from the first cylinder groups are deactivated. Accordingly, for the first cylinder (CYL 1) fuel injection is on, as shown by curve 308, the first exhaust valve is active, as shown by curve 310, and the second exhaust valve is active, as shown by curve 312. Conversely, for the second cylinder (CYL 2), fuel injection is off, as shown by curve 314, the first exhaust valve is inactive, as shown by curve 316, and the second exhaust valve is inactive, as shown by curve 318. Both turbochargers are active (e.g., driven to generate boost), and hence the shut-off valve is open, as shown by curve 320, and the electric assist is inactive, as shown by curve 322.

Just prior to time T1, engine load begins to increase due to, for example, an operator tip-in. As a result, the engine may not be able to meet the torque request while operating with only a portion of the cylinders, and hence at time T1 the engine switches to operation in the fourth mode, as both engine load and engine speed (as shown by curve 304) are relatively high. Accordingly, the second cylinder is reactivated and all cylinders direct exhaust gas to both turbochargers. For the first cylinder, fuel injection remains on and both the first and second exhaust valves remain active. For the second cylinder, fuel injection resumes (e.g., switches from off to on), the first exhaust valve switches from inactive to active, and the second exhaust valve switches from inactive to active. The compressor shut-off valve remains open, as both turbochargers are active to provide boost (which may be increased to the high load demand, as shown by curve 306), and the electric assist is inactive.

At time T2, engine speed and load are dropping, as is required boost pressure, and hence the engine enters into operation in the second mode, where all cylinders are active but the boost demand is met via operation of only the second turbocharger. Accordingly, for the first cylinder, fuel injection remains on and the first exhaust valve remains active. However, the second exhaust valve switches from active to inactive. As such, all exhaust from the first cylinder is directed to the second turbine. For the second cylinder, fuel injection remains on, the first exhaust valve remains active, and the second exhaust valve is switched from active to inactive. As such, all exhaust from the second cylinder is directed to the second turbine. Due to the boost demand being met by only the second turbocharger, the first turbocharger is inactivated by the compressor shut-off valve being moved from open to closed (e.g., fully closed). The electric assist remains inactive, as no exhaust is flowing through the first turbine.

At time T3, boost pressure may exceed a threshold pressure, and hence the engine begins to operate in the third mode, in order to redirect some exhaust gas away from the second turbine. To accomplish this, the second exhaust valve of the first cylinder and the second exhaust valve from the second cylinder are re-activated and thus exhaust from the cylinders flows to both the first turbine and the second turbine. However, because the first turbocharger is not needed to meet the boost demand, the shut-off valve is maintained closed, and the first turbine instead drives the electric assist, which at time T3 is activated.

The technical effect of doing diverting excess exhaust gas to a first turbine while using only the second turbine to generate boost pressure is increased engine efficiency and lowered system cost and complexity.

As one embodiment, a method includes, responsive to a first condition, deactivating a first compressor of a first turbocharger, activating each first exhaust valve of each cylinder of an engine, and deactivating each second exhaust valve of each cylinder of the engine to flow exhaust gas from the engine to a second turbocharger; and responsive to boost pressure exceeding a threshold, maintaining deactivation of the first compressor, reactivating each second exhaust valve to flow exhaust gas from the engine to both the first turbocharger and second turbocharger, and driving an electric assist device via a first turbine of the first turbocharger. In a first example of the method, the first condition comprises engine load above a threshold load and engine speed below a threshold speed. A second example optionally includes the first example and further includes where deactivating the first compressor comprises closing a compressor shut-off valve to block flow of intake air through the first compressor. A third example optionally one or both of the first and second examples and further includes during both the first condition and responsive to boost pressure exceeding the threshold, flowing intake air through a second compressor of the second turbocharger.

An embodiment of a system includes an engine having a first cylinder group and a second cylinder group, each cylinder of the engine including a first exhaust valve controlling a first exhaust port and a second exhaust valve controlling a second exhaust port; a first exhaust manifold fluidically coupled to each second exhaust port; a second exhaust manifold fluidically coupled to each first exhaust port; a first turbocharger including a first turbine fluidically coupled to the first exhaust manifold and a first compressor coupled to the first turbine, flow of intake air through the first compressor controlled by compressor recirculation valve coupled in parallel to the first compressor and a compressor shut-off valve coupled downstream of the first compressor; a second turbocharger including a second turbine fluidically coupled to the second exhaust manifold and a second compressor coupled to the second turbine; an electric assist device coupled to the first turbine; and a controller including instructions to, during a first condition, provide boost pressure only via the second turbocharger, and responsive to the boost pressure exceeding a threshold pressure, reactivate each second exhaust valve to divert excess exhaust gas from the engine to the first turbine, close the compressor shut-off valve, and drive the electric assist device in a generator mode.

In a first example of the system, during the first condition when the boost pressure does not exceed the threshold pressure, the controller includes instructions to deactivate each second exhaust valve in order to provide boost pressure only via the second turbocharger. A second example optionally includes the first example and further includes wherein the controller includes further instructions to, during a second condition, deactivate each cylinder of the second cylinder group, open the compressor shut-off valve, and flow exhaust gas from the first cylinder group to the first turbocharger and the second turbocharger. A third example optionally includes one or both of the first and second examples and further includes wherein the controller includes further instructions to, during a third condition, activate each cylinder of the engine, activate each first exhaust valve and second exhaust valve of each cylinder, open the compressor shut-off valve, and flow exhaust gas from the first cylinder group and the second cylinder group to the first turbocharger and the second turbocharger. A fourth example optionally includes one or more or each of the first through third examples and further includes wherein the first condition comprises engine load above a threshold load and engine speed below a threshold speed, the second condition comprises engine load below the threshold load, and the third condition comprises engine load above the threshold load and engine speed above the threshold speed.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
an intake system for supplying charge air to an engine having at least two cylinders, each cylinder including at least two outlet openings for discharge of exhaust gases, at least one of the at least two outlet openings of each cylinder being a switchable outlet opening, each outlet opening being adjoined by an exhaust line for the discharge of the exhaust gases via an exhaust-gas discharge system, and wherein the at least two cylinders form at least two cylinder groups with at least one cylinder, the at least one cylinder of a first cylinder group being a cylinder which is operational during a partial deactivation of the engine, and the at least one cylinder of a second cylinder group being formed as a load-dependently switchable cylinder, and all of outlet openings of the at least one cylinder of the second cylinder group are in the form of switchable outlet openings;
a first exhaust-gas turbocharger and a second exhaust-gas turbocharger, each exhaust-gas turbocharger comprising a turbine arranged in the exhaust-gas discharge system and a compressor arranged in the intake system;
a first exhaust manifold formed from a first overall exhaust line, the exhaust line of the at least one switchable outlet opening of each cylinder discharging into the first overall exhaust line, said first overall exhaust line being connected to a first turbine of the first exhaust-gas turbocharger;
a second exhaust manifold formed from a second overall exhaust line, the exhaust lines of the other outlet openings of the at least two cylinders merging to form the second overall exhaust line, said second overall exhaust line being connected to a second turbine of the second exhaust-gas turbocharger;
a first compressor of the first exhaust-gas turbocharger arranged in a first intake line of the intake system, a shut-off element being arranged in the first intake line, and at least each switchable outlet opening whose exhaust line discharges into the first overall exhaust line equipped with an at least partially variable valve drive having at least one switchable outlet valve which opens up an associated outlet opening between an open position and a closed position, forming a valve lift $\Delta h$, during an opening duration $\Delta t$; and
an electric machine which is at least connectable in terms of drive to the first turbine of the first exhaust-gas turbocharger and which is operable, as a generator, for receiving power from the first turbine;
wherein the second turbine of the second exhaust-gas turbocharger does not have a bypass line.

2. The engine system as claimed in claim 1, wherein the at least two cylinders are arranged into the first cylinder group and the second cylinder group, where at least one cylinder of the first cylinder group has only one switchable outlet opening, an exhaust line of which issues into the first overall exhaust line.

3. The engine system as claimed in claim 1, wherein the at least two cylinders are arranged into the first cylinder group and the second cylinder group, where all of outlet openings of the at least one cylinder of the first cylinder group are in the form of switchable outlet openings.

4. The engine system as claimed in claim 1, wherein the at least one switchable outlet valve of the each switchable outlet opening whose exhaust line discharges into the first overall exhaust line is an outlet valve which is adjustable with regard to the valve lift $\Delta h$.

5. The engine system as claimed in claim 4, wherein the at least one switchable outlet valve of the each switchable outlet opening whose exhaust line discharges into the first overall exhaust line is an outlet valve which is adjustable in a two-stage fashion, a multi-stage fashion, or a continuously adjustable fashion, with regard to the valve lift $\Delta h$.

6. The engine system as claimed in claim 1, wherein the at least one switchable outlet valve of the each switchable outlet opening whose exhaust line discharges into the first overall exhaust line is an outlet valve which is adjustable with regard to the opening duration $\Delta t$.

7. The engine system as claimed in claim 1,
wherein the engine has at least four cylinders in an in-line arrangement along a longitudinal axis of a cylinder head of the engine, and
wherein outer cylinders form one cylinder group and at least two inner cylinders form another cylinder group.

8. The engine system as claimed in one claim 1,
wherein the overall exhaust lines merge to form a common exhaust line downstream of the turbines, and
wherein the electric machine, which is coupled to the first turbine of the first exhaust-gas turbocharger, is operable as an auxiliary drive for assisting the first exhaust-gas turbocharger.

9. A method for operating an engine, comprising:
determining engine operating conditions via a controller;
responsive to a first condition determined via the controller, deactivating a first compressor of a first turbocharger, activating each first exhaust valve of each cylinder of the engine, and deactivating each second exhaust valve of each cylinder of the engine to flow exhaust gas from the engine to a second turbocharger; and
responsive to boost pressure exceeding a threshold determined via the controller, maintaining deactivation of the first compressor, reactivating each second exhaust valve to flow exhaust gas from the engine to both the first turbocharger and the second turbocharger, and driving an electric assist device via a first turbine of the first turbocharger.

10. The method of claim 9, wherein the first condition comprises engine load above a threshold load as determined via the controller and engine speed below a threshold speed as determined via the controller.

11. The method of claim 9, wherein deactivating the first compressor comprises closing a compressor shut-off valve via the controller to block flow of intake air through the first compressor.

12. The method of claim 9, further comprising, during the first condition and responsive to boost pressure exceeding the threshold as determined via the controller, flowing intake air through a second compressor of the second turbocharger via activating a switchable outlet opening of a cylinder.

13. A system, comprising:
an engine having a first cylinder group and a second cylinder group, each cylinder of the engine including a first exhaust valve controlling a first exhaust port and a second exhaust valve controlling a second exhaust port;
a first exhaust manifold fluidically coupled to the second exhaust port of the cylinder in the first cylinder group and the second cylinder group;
a second exhaust manifold fluidically coupled to the first exhaust port of the cylinder in the first cylinder group and the second cylinder group;
a first turbocharger including a first turbine fluidically coupled to the first exhaust manifold and a first compressor coupled to the first turbine, flow of intake air through the first compressor controlled by a compressor recirculation valve coupled in parallel to the first compressor and a compressor shut-off valve coupled downstream of the first compressor;
a second turbocharger including a second turbine fluidically coupled to the second exhaust manifold and a second compressor coupled to the second turbine;
an electric assist device coupled to the first turbine; and
a controller including instructions to determine engine operating conditions, during a first condition determined from the engine operating conditions, provide boost pressure only via the second turbocharger via closing the compressor shut-off valve, and responsive to boost pressure exceeding a threshold pressure determined via the controller, reactivate the second exhaust valve to divert excess exhaust gas from the engine to the first turbine, close the compressor shut-off valve, and drive the electric assist device in a generator mode.

14. The system of claim 13, wherein, during the first condition when the boost pressure does not exceed the threshold pressure, the controller includes instructions to deactivate the second exhaust valve of the cylinder in the first cylinder group and the second cylinder group in order to provide boost pressure only via the second turbocharger.

15. The system of claim 14, wherein the controller includes further instructions to, during a second condition determined from the engine operating conditions, deactivate the cylinder of the second cylinder group, open the compressor shut-off valve, and flow exhaust gas from the first cylinder group to the first turbocharger and the second turbocharger.

16. The system of claim 15, wherein the controller includes further instructions to, during a third condition determined from the engine operating conditions,
activate the cylinder in the first cylinder group and the second cylinder group of the engine,
activate the first exhaust valve and the second exhaust valve of the cylinder in the first cylinder group and the second cylinder group,
open the compressor shut-off valve, and
flow exhaust gas from the first cylinder group and the second cylinder group to the first turbocharger and the second turbocharger.

17. The system of claim 16, wherein the first condition comprises engine load above a threshold load and engine speed below a threshold speed, the second condition comprises engine load below the threshold load, and the third condition comprises engine load above the threshold load and engine speed above the threshold speed.

* * * * *